US007788712B2

(12) United States Patent
Hong et al.

(10) Patent No.: US 7,788,712 B2
(45) Date of Patent: Aug. 31, 2010

(54) MANAGING ACCESS TO A DOCUMENT-PROCESSING DEVICE USING AN IDENTIFICATION TOKEN

(75) Inventors: Jiang Hong, San Jose, CA (US); Ke Wei, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1122 days.

(21) Appl. No.: 11/447,539

(22) Filed: Jun. 5, 2006

(65) Prior Publication Data
US 2007/0283447 A1 Dec. 6, 2007

(51) Int. Cl.
G06F 21/00 (2006.01)
G06K 7/10 (2006.01)
G06K 5/00 (2006.01)

(52) U.S. Cl. .............................. 726/9; 726/20; 713/185; 285/377; 285/382

(58) Field of Classification Search ...................... 726/9, 726/20; 713/185; 235/377, 382
See application file for complete search history.

(56) References Cited

U.S. PATENT DOCUMENTS

| 5,297,148 | A | 3/1994 | Harari et al. | |
|---|---|---|---|---|
| 5,898,830 | A | 4/1999 | Wesinger et al. | |
| 6,557,032 | B1 | 4/2003 | Jones et al. | |
| 6,583,888 | B1 * | 6/2003 | Salgado et al. | 358/1.15 |
| 7,025,260 | B1 * | 4/2006 | Stevens et al. | 235/382 |
| 7,243,853 | B1 | 7/2007 | Levy et al. | |
| 7,248,693 | B1 * | 7/2007 | Tretter et al. | 380/55 |
| 7,310,162 | B2 * | 12/2007 | Morris-Jones | 358/1.15 |
| 7,443,527 | B1 * | 10/2008 | Shigeeda | 358/1.15 |
| 7,540,416 | B2 * | 6/2009 | Hong et al. | 235/382 |
| 7,580,651 | B2 * | 8/2009 | Namizuka et al. | 399/75 |
| 2001/0048823 | A1 | 12/2001 | Nomura et al. | |
| 2003/0011809 | A1 | 1/2003 | Suzuki et al. | |
| 2003/0014315 | A1 | 1/2003 | Jaalinoja et al. | |

(Continued)

FOREIGN PATENT DOCUMENTS

EP        0929023        7/1999

(Continued)

OTHER PUBLICATIONS

European Patent Office, "European Search Report", Application No. EP 07252254, dated Nov. 11, 2008, 7 pages.

*Primary Examiner*—Christian LaForgia
(74) *Attorney, Agent, or Firm*—Hickman Palermo Truong & Becker LLP; Edward A. Becker

(57) ABSTRACT

A method and apparatus for accessing a document-processing device is provided. A request to access the document-processing device is received by the document-processing device. For example, the request may be a request to configure the document-processing device or a request to produce an electronic copy of a document. The document-processing device reads authentication data from an authentication token, which is a portable physical object associated with the user that issued the request. For example, the authentication token may be a proximity card, a common access card (CAC), a smart card, a credit card, a driver's license, or a cell phone. The document-processing device determines, based on the authentication data, whether the user has sufficient user access privileges to perform the request. If user has sufficient user access privileges to perform of the request, then the document-processing device performs the request.

36 Claims, 5 Drawing Sheets

U.S. PATENT DOCUMENTS

| | | |
|---|---|---|
| 2003/0142990 A1 | 7/2003 | Weaver |
| 2004/0114175 A1* | 6/2004 | Cherry et al. ............... 358/1.15 |
| 2004/0190038 A1 | 9/2004 | Shahindoust |
| 2005/0081136 A1* | 4/2005 | Morris-Jones et al. ...... 715/500 |
| 2005/0094184 A1 | 5/2005 | Suyehira |
| 2005/0264846 A1* | 12/2005 | Tsuzuki ..................... 358/1.18 |
| 2005/0271410 A1* | 12/2005 | Namizuka et al. ............. 399/75 |

FOREIGN PATENT DOCUMENTS

| | | |
|---|---|---|
| EP | 1400888 | 3/2004 |
| EP | 1553525 | 7/2005 |
| WO | WO 99/49379 | 9/1999 |

* cited by examiner

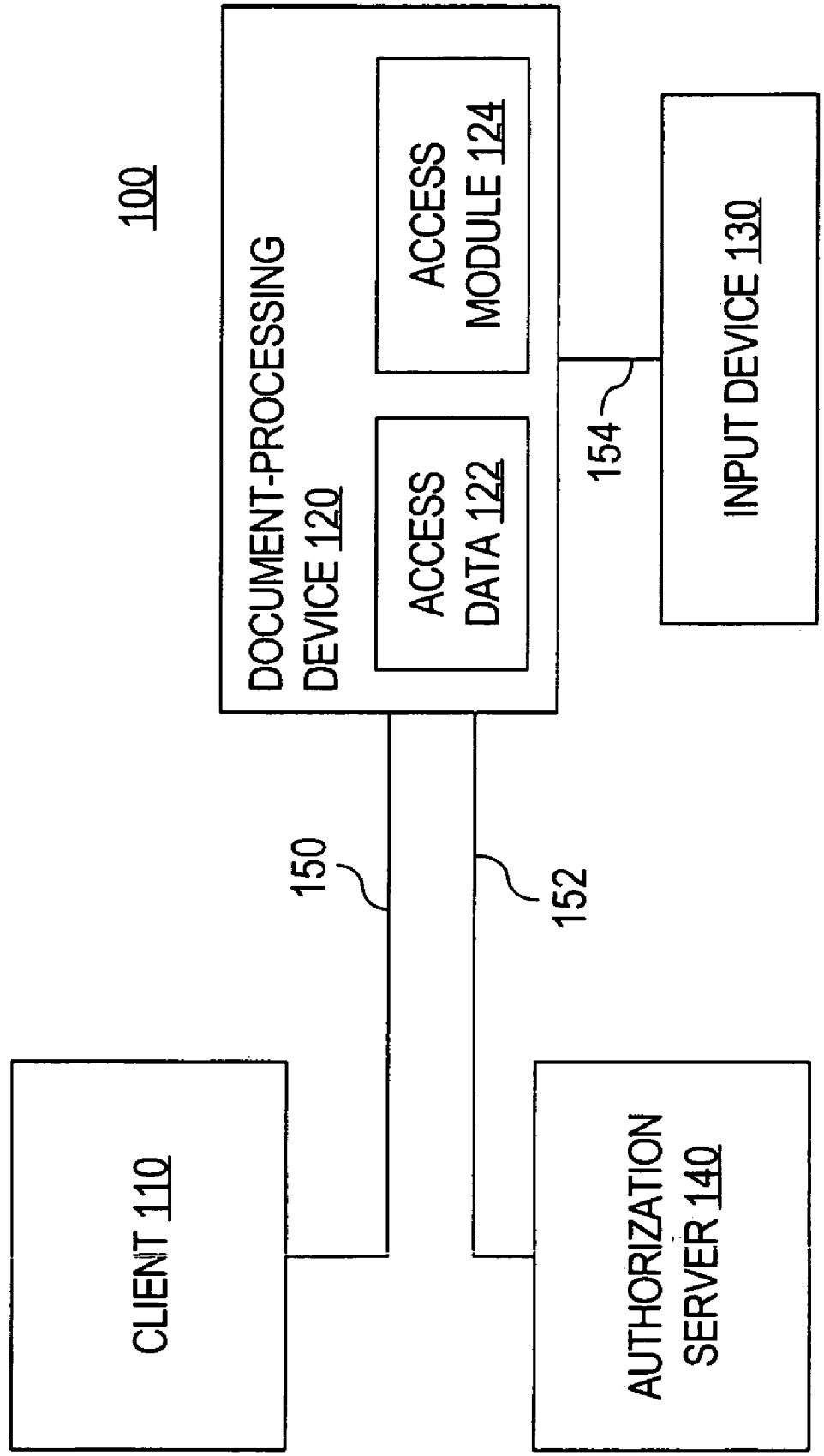

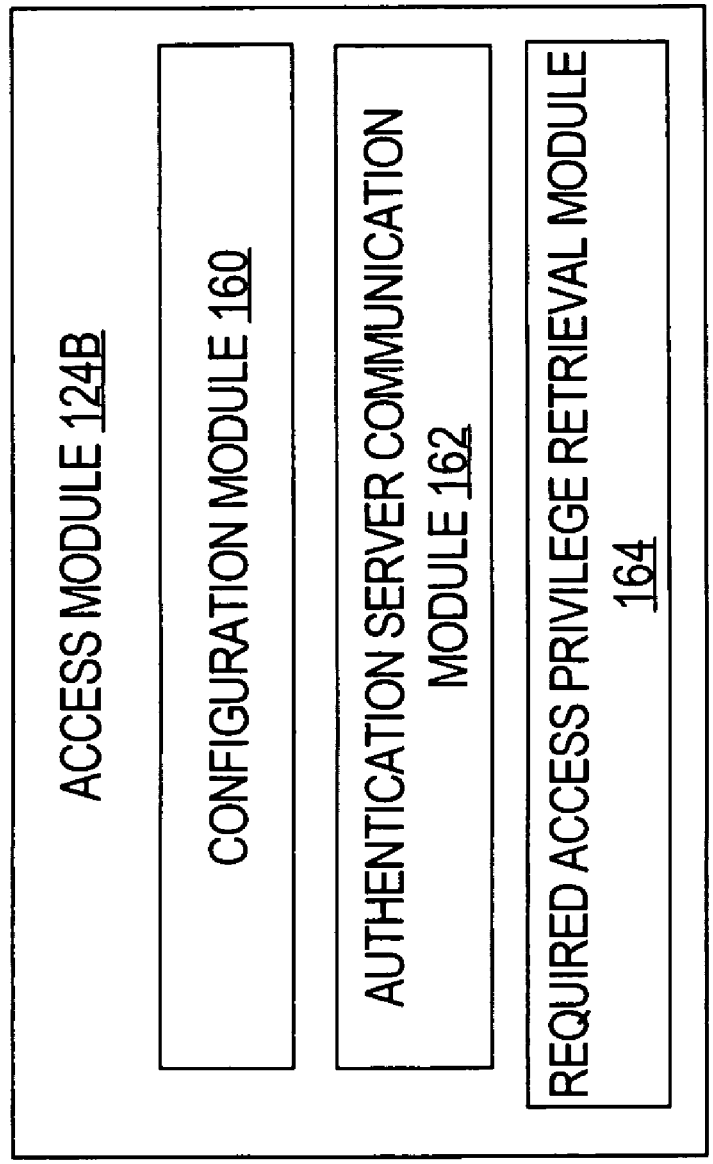

ILLUSTRATIVE ACCESS MODULE 124C FOR PROCESSING A COMMON ACCESS CARD (CAC)

MANAGING ACCESS TO A DOCUMENT-PROCESSING DEVICE USING AN IDENTIFICATION TOKEN

RELATED APPLICATION DATA

This application is related to U.S. patent application Ser. No. 11/355,113, filed Feb. 14, 2006, entitled "Smart Card Authentication System With Multiple Card and Server Support," the disclosure of which is incorporated by reference in its entirety for all purposes as if fully set forth herein.

FIELD OF THE INVENTION

The present invention relates to managing access to a document-processing device using an identification token.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is often desirable to control or monitor access to document-processing device, such as a printer or a scanner. For example, a company that deals in confidential information may wish to restrict access to any device that may be used to duplicate or print a document. As another example, a company may wish to restrict access to certain devices, such as a color printer, to only those employees having a job that requires use of the device.

One approach for restricting access to a printer involves the use of a username and password combination. Before a user may access certain functions of the printer, such as a lock print function, a user may need to submit a valid username and password to the printer. Typically, the printer provides an interface through which the user may submit his or her username and password to the printer. This approach is problematic in that it requires the user to remember his or her username and password. Also, typing in a username and password combination into the interface requires a certain amount of time and effort, which may result in frustration over time.

SUMMARY

Techniques are provided for managing access to a document-processing device using an identification token. An authentication token is a portable physical object associated with a user. By managing access to the document-processing device using the authentication token, access to the document-processing device may be managed with greater convenience to the users of the document-processing device, as the users are no longer burdened with the responsibility of remembering their usernames and passwords. Additionally, embodiments of the invention offer additional security over prior approaches by managing access on the basis of a physical object, rather than on information (such as a username and password) that may be easily communicated, willingly or unknowingly, to others.

In an embodiment, a request to access the document-processing device is received by a document-processing device. For example, the request may be a request to configure the document-processing device, a request to produce an electronic copy of an electronic document, or a request to print a printed copy of a document. The document-processing device reads authentication data from an authentication token. For example, the authentication token may be a proximity card, a common access card (CAC), a smart card, a credit card, a driver's license, or a cell phone. The document-processing device determines, based on the authentication data, whether the user has sufficient user access privileges to perform the request. If user has sufficient user access privileges to perform of the request, then the document-processing device performs the request. In this way, access to the functions provided by the document-processing device may be managed with greater ease and control than prior approaches.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 1A is a block diagram of an illustrative system according to an embodiment of the invention;

FIG. 1B is a block diagram of an illustrative access module for processing a proximity card according to an embodiment of the invention;

DETAILED DESCRIPTION

Figure 1C:
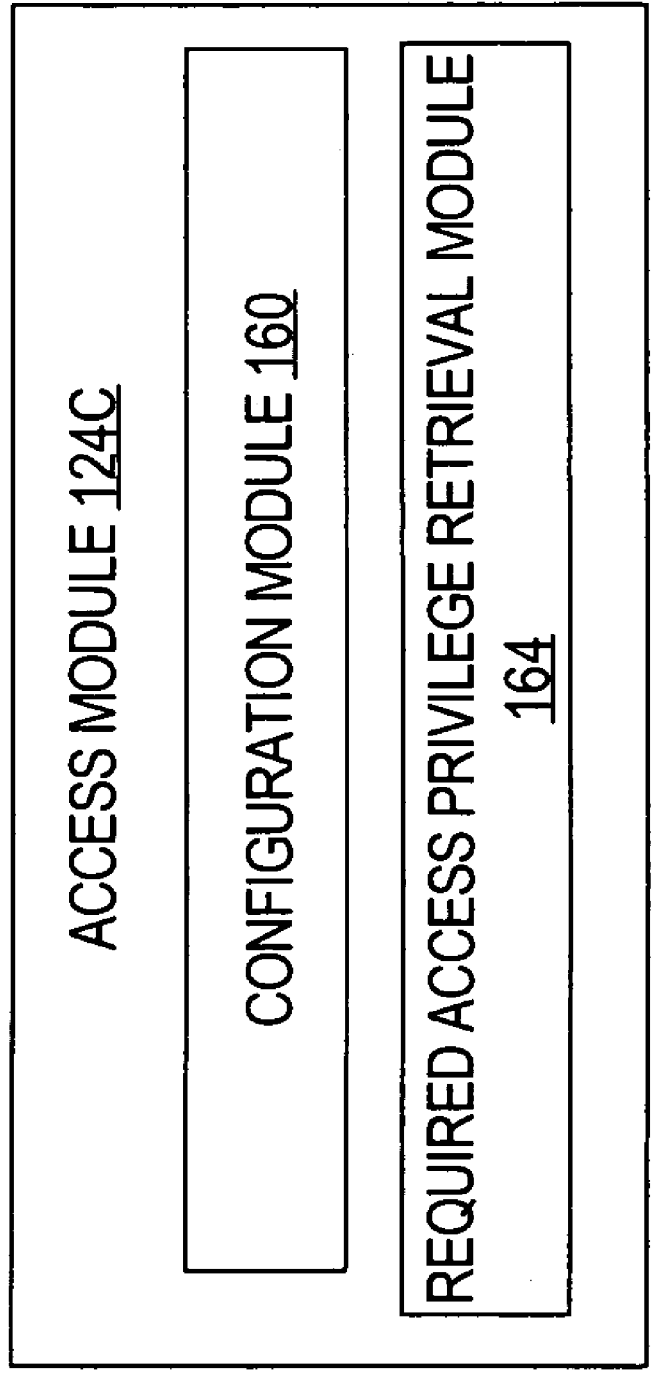
FIG. 1C is a block diagram of an illustrative access module for processing a common access card (CAC) according to an embodiment of the invention.

In the following description, for the purposes of explanation, numerous specific details are set forth in order to provide a thorough understanding of the embodiments of the invention discussed herein. It will be apparent, however, that the embodiments of the invention discussed herein may be practiced without these specific details. In other instances, well-known structures and devices are shown in block diagram form in order to avoid unnecessarily obscuring the embodiments of the invention discussed herein.

Architecture Overview

FIG. 1A is a block diagram of an illustrative system 100 according to an embodiment of the invention. System 100 of FIG. 1A may be used to manage access to a document-processing device using an authentication token. An authentication token is a portable physical object associated with a user that issued the request. Non-limiting, illustrative examples of an authentication token include a proximity card, a common access card (CAC), a smart card, a credit card, a driver's license, or a cell phone.

System 100 includes client 110, document-processing device 120, input device 130, authorization server 140, and communications links 150, 152, and 154. In an embodiment, a user may gain access to one or more functions provided by document-processing device 120 by being authenticated using an authentication token.

Client 110 may be implemented by any medium or mechanism that provides for communicating with document-processing device 120. For example, a user may use client 110 to issue a request (a "print request") to print a physical copy of an electronic document to document-processing device 120.

A user may also user client 110 to send other types of requests to document-processing device 120, e.g., a request (a "fax request") to send a facsimile copy of an electronic document to a party, a request (a "scan request") to produce an electronic copy of a printed document, or a request ("a configuration request") to configure the operation of document-processing device 120. For purposes of providing a clear example, only one client is depicted in FIG. 1A; however, embodiments of the invention may employ any number of clients, including zero or more clients. Non-limiting, illustrative examples of a client include a web-browser, a software application, a wireless device, a cell phone, and a personal computer (PC). While client 110 is depicted as part of system 100 in FIG. 1A, as explained in further detail below, other embodiments of the invention may not include client 110, as a user may issue a request to document-processing device 120 using an interface provided by document-processing device 120. Consequently, client 110 is optional, and system 100 need not include client 110 in all embodiments of the invention.

Document-processing device 120 may be implemented by any medium or mechanism that provides for processing a document. For example, document-processing device 120 may include any device that is capable of performing at least one of: producing a printed copy of an electronic document, producing a printed copy of a printed document, sending or receiving an electronic document, and producing an electronic copy of a printed document. Non-limiting, illustrative examples of document-processing device 120 include a printer, a multi-function peripheral (MFP), a facsimile, a photocopier, and a scanner. Document-processing device 120 may receive requests from users either from client 110 or from an interface provided by document-processing device 120. For example, in an embodiment, a user may configure document-processing device 120 to perform a specific function using a graphical user interface provided by document-processing device 120.

In an embodiment, document-processing device 120 includes access data 122 and access module 124. Access data 122 is data that describes, for one or more functions provided by document-processing device 120, a set of required access privileges that are required to access each function. To illustrate, in an embodiment, document-processing device 120 may support function A and function B. Access data 122 may describe that, in order for a user to have access to function A, the user must be assigned access privileges (hereinafter referred to as "user access privileges") of equal or greater value than the required access privileges for function A, and in order for a user to have access to function B, the user must be assigned user access privileges of equal or greater value than the required access privileges for function B. While access data 122 is graphical depicted in FIG. 1A as being stored at document-processing device 120, in other embodiments of the invention not depicted, access data 122 may be stored at a location external to but accessible by document-processing device 120.

Access module 124 is a software module responsible for managing access to document-processing device 120. In an embodiment, prior to document-processing device 120 allowing a particular user to access a desired function provided by document-processing device 120, access module 124 verifies that the user access privileges for the particular user are of equal or greater value than the required access privileges associated with the desired function(s). Additionally, in another embodiment, when a user wishes to access a function provided by document-processing device 120, access module 124 may retrieve a set of user access privileges for the user from authorization server 140 using authentication data obtained from the authentication token. The actions performed by access module 124 shall be described in further detail below.

Input device 130 may be implemented by any medium or mechanism that provides for reading authentication data from an authentication token associated with the user. Non-limiting illustrative examples of input device 130 include a scanner and a bar-code reader. In an embodiment, input device 130 may be physically connected to document-processing device 120. For example, in an embodiment not depicted in FIG. 1A, document-processing device 120 and input device 130 may be implemented on the same machine. As another example, input device 130 may be physically connected to document-processing device 120 via a physical embodiment of communications link 154, such as a cable. In another embodiment, input device 130 may be operationally connected, but not physically connected, to document-processing device 120, e.g., input device 130 may be able to communicate wirelessly over communications link 154 with document-processing device 120.

Authorization server 140 may be implemented by any medium or mechanism that is capable of providing document-processing device 120 with user access privileges for a user. To illustrate, in an embodiment, access module 124 may sent a request to authorization server 140. The request contains a user identifier for a user. Based on the user identifier, authorization server 140 determines the user access privileges for the user, and sends the user access privileges for the user to access module 124. Authorization server 140 may be implemented as a set of software instructions executing on a computer system. While authorization server 140 is depicted as part of system 100 in FIG. 1A, as explained in further detail below, other embodiments of the invention may not include authorization server 140. Consequently, authorization server 140 is optional, and need not be present in all embodiments of the invention.

Communications link 150 may be implemented by any medium or mechanism that provides for the exchange of data between a client and document-processing device 120. Communications link 152 may be implemented by any medium or mechanism that provides for the exchange of data between authorization server 152 and document-processing device 120. Communications link 154 may be implemented by any medium or mechanism that provides for the exchange of data between input device 130 and document-processing device 120. Examples of communications links 150, 152, and 154 include, without limitation, a network such as a Local Area Network (LAN), Wide Area Network (WAN), Ethernet or the Internet, or one or more terrestrial, satellite or wireless links.

Having described an illustrative system according to an embodiment of the invention, the functional steps of managing access to a document-processing device using an authentication token according to an embodiment of the invention shall now be presented.

Managing Access to a Document-Processing Device Using an Authentication Token

Figure 2:
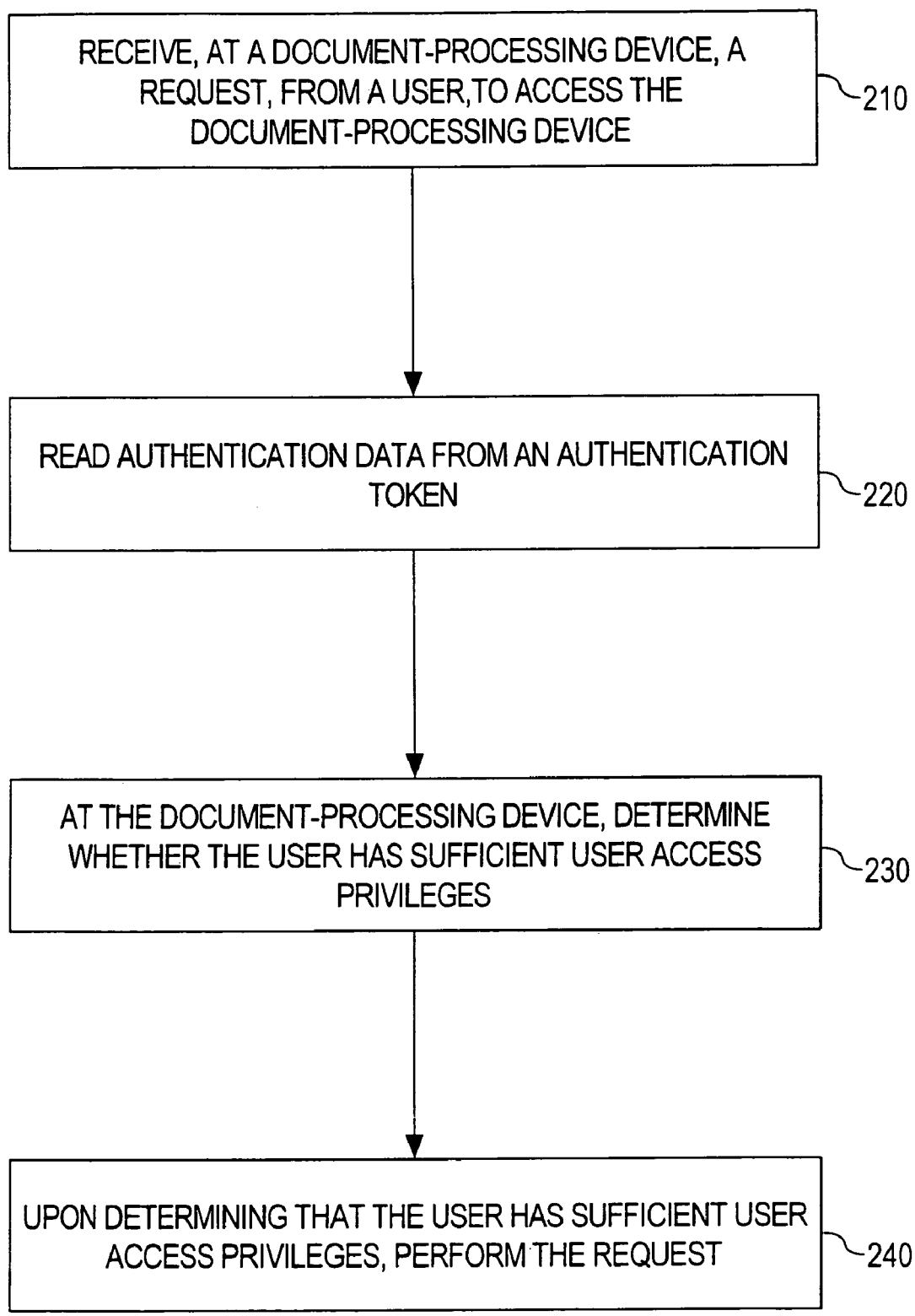
FIG. 2 is a flowchart illustrating the functional steps of managing access to a document-processing device according to an embodiment of the invention.

FIG. 2 is a flowchart illustrating the functional steps of managing access to a document-processing device according to an embodiment of the invention. To facilitate the description of the steps of FIG. 2, the description of the step of FIG. 2 shall make reference to system 100 of FIG. 1A.

The steps of FIG. 2 shall be explained below using several illustrative examples involving both a proximity card and a common access card (CAC). A proximity card is a portable object that contains a user identifier, which is information that uniquely identifies the user associated with the proximity card. A user may present a proximity card to input device 130 to enable input device 130 to read the user identifier from the proximity card. When input device 130 reads the user identifier from the proximity card, input device 130 provides the user identifier to document-processing device 120. Access module 124 may thereafter contact authorization server 140 to obtain the user access privileges for the user of the proximity card by providing authorization server 140 with the user identifier. Authorization server 140 retrieves the user access privileges for the user using the user identifier, and thereafter sends the user access privileges to access module 124.

A CAC is a portable object that contains a more detailed set of information about a user than a proximity card. For example, in an embodiment, a CAC contains the user access privileges for a user. Thus, user input device 130 may read the user access privileges for a user directly from the CAC, and provide the user access privileges to document-processing device 120. Thus, it is not necessary for the access module 124 to contact authorization server 140 to obtain the user access privileges of a user of a CAC, because the user access privileges are identified by the information stored on the CAC.

Initially, in step 210, a request, from a user, to access one or more desired functions of document-processing device 120 is received at document-processing device 120. A user may send the request of step 210 to document-processing device 120 in a variety of ways. For example, the user may issue a request via client 110 or via a graphical user interface provided by document-processing device 120.

The request of step 210 may be a request to access any function provided by document-processing device 120. For example, the request of step 210 may be a configuration request, a print request, a scan request, or a fax request.

In an embodiment, the request of step 210 is received at document-processing device 120 by access module 124. After the request of step 210 is received by document-processing device 120, processing proceeds to step 220.

In step 220, document-processing device 120 reads authentication data from the authentication token using input device 130. Authentication data is data that may be used by access module 124 to identify the user access privileges of the user. For example, the authentication data may itself contain or identify the user access privileges (such as the authentication data stored on a CAC) or the authentication data may contain a user identifier (such as the authentication data stored on a proximity card) that may be used by access module 124 to obtain the user access privileges from authorization server 140.

In an embodiment, after the user issues the request of step 210, the user presents an authentication token to input device 130 to allow input device 130 to read authentication data from the authentication token. Thereafter, input device 130 sends the authentication data to access module 124 over communications link 154.

For example, a user may issue using client 110 a print request to document-processing device 120 in step 210. Thereafter, the user may walk to input device 130 and present his cell phone to input device 130. Input device 130, in step 220, reads authentication data from the cell phone, e.g., input device 130 may read information (such as a bar code or a alpha-numerical string) from a screen of the cell phone. Having read the authentication data from the cell phone, input device 130 then sends the authentication data to access module 124.

After the document-processing device 120 reads authentication data from the authentication token, processing proceeds to step 230.

In step 230, document-processing device 120 determines whether the user has sufficient user access privileges to access the desired function(s) of document-processing device 120. In an embodiment, access module 124 performs step 230 by comparing the user access privileges with the required access privileges for the requested function(s) provided by document-processing device 120 identified in the received request.

Access module 124 may be implemented in a variety of different ways, as the information contained in an authentication token may differ from one embodiment to another. FIG. 1B is a block diagram of an illustrative access module 124 for processing a first type of authentication token according to an embodiment of the invention. The first type of authentication token, which may be processed by access module 124B of FIG. 1B, includes any type of authentication token that stores authentication data that includes either a user identifier or the user access privileges for the user of the authentication token. For example, access module 124B of FIG. 1B may process a proximity card.

Access module 124B of FIG. 1B includes configuration module 160, authentication server communication module 162, and required access privilege retrieval module 164. Configuration module 160 is a software module that enables an administrator to configure the operation of access module 124B. An administrator may use configuration module 160 to create or update access data 122, e.g., the administrator may identify, record, and/or update a set of required access privileges for any functions provided by document-processing device 120 in access data 122.

Authentication server communication module 162 is a software module that is capable of communicating with authorization server 140. Access module 124B uses Authentication server communication module 162 to send a request for a set of user access privileges to authorization server 140. The request contains a user identifier. Authorization server 140, upon receiving the request from authentication server communication module 162, retrieves the user access privileges associated with the user identifier, and thereafter sends the user access privileges to authentication server communication module 162. In this way, authentication server communication module 162 may obtain the user access privileges for a user using the user identifier associated with the user.

Required access privilege retrieval module 164 is a software module that is capable of retrieving the required access privileges, for the function(s) provided by document-processing device 120 that were requested in the request of step 210, from access data 122. The required access privileges for the function(s) provided by document-processing device 120 are identified in access data 122.

Thus, in step 230, access module 124B receives authentication data that identifies a user identifier for a user of the authentication token. After verifying that the authentication token is associated with the same user that issues the request of step 210, access module 124B retrieves the user access privileges using authentication server communication module 162. Next, access module 124B retrieves the required access privileges for the function(s) requested provided by document-processing device 120 that were requested in step 210 using required access privilege retrieval module 164. Thereafter, access module 124B determines whether the user has sufficient user access privileges to access each desired function of document-processing device 120. For example, the access module 124B may ensure that, for each requested function of document-processing device 120, the user has a user access privilege of equal or greater value than the required access privilege for that function. In this way, access module 124B may determines whether the user presenting a proximity card has sufficient user access privileges to access a desired function of document-processing device 120.

FIG. 1C is a block diagram of an illustrative access module 124 for processing a second type of authentication token according to an embodiment of the invention. The second type of authentication token, which may be processed by access module 124C of FIG. 1C, includes any type of authentication token that stores authentication data that includes the user access privileges for the user of the authentication token. For example, access module 124C of FIG. 1C may process a CAC.

In an embodiment, access module 124C includes configuration module 160 and required access privilege retrieval module 164, which function as described above. In step 230, access module 124C receives authentication data that identifies the user access privileges for a user of the authentication token. Access module 124C retrieves the required access privileges, for the function(s) requested provided by document-processing device 120 that were requested in step 210, using required access privilege retrieval module 164. Thereafter, access module 124C determines whether the user has sufficient user access privileges to access each desired function of document-processing device 120. For example, the access module 124c may ensure that, for each requested function of document-processing device 120, the user has a user access privilege of equal or greater value than the required access privilege for that function. In this way, access module 124C may determines whether the user presenting a CAC has sufficient user access privileges to access a desired function of document-processing device 120.

In step 240, upon document-processing device 120 determining that the user has sufficient user access privileges to access the desired function(s) of the document-processing device 120, document-processing device 120 performs the request to access the desired function(s) of document-processing device 120.

Upon document-processing device 120 determining that the user does not have sufficient user access privileges to access the desired function(s) of the document-processing device 120, document-processing device 120 may display an error message at the location where the user initiated the request. For example, if the user initiated the request of step 210 at client 110, then document-processing device 120 may send an error message indicating the request will not be performed to client 110. As another example, if the user initiated the request of step 210 at a graphical user interface provided by document-processing device 120, then document-processing device 120 may display an error message at the graphical user interface indicating the request will not be performed.

In some situations, in the performance of step 230, it may be necessary for access module 124 to request additional authentication information to determine whether the user has sufficient user access privileges to access the desired function(s) of the document-processing device 120. Embodiments of the invention that address these situations shall be discussed below.

Managing Access Using Additional Authentication Information

In some situations, it may be necessary for access module 124 to request additional authentication information to determine whether the user has sufficient user access privileges to access the desired function(s) of the document-processing device 120. For example, if communications link 152 becomes unavailable, then authentication server communication module 162 will not be able to communicate with authorization server 140, and consequently access module 124B will not be able to ascertain the user access privileges of a user. For example, if access module 124 fails to receive a reply from a communication sent to authorization server 140 after a predetermined period of time, access module 124 may either (a) refuse to perform the request of step 210, or (b) may prompt the user to supply additional authentication information which will be used by access module 124 to determine whether that the user has sufficient user access privileges to access the desired function(s) of the document-processing device 120.

In other embodiment, access module 124 may require, in additional to the authentication data supplied by the authentication token, that the user submit additional authentication information before determining whether the user has sufficient user access privileges for document-processing device 120 to perform the requested function. In this way, access module 124 helps verify the identity of the user that presented the authentication token, as the additional authentication information provides a secondary check as to the user's identity and/or the user access privileges of the user.

In an embodiment, the additional authentication information requested by the access module 124 may be of any form, including, but not limited to: a username/password combination, a password, biometric information (such as a fingerprint scan or a retina scan), and a barcode. The additional authentication information may be submitted by the user through input device 130 (for example, in the case where the additional authentication information is a barcode or biometric information) or through a graphical user interface provided by document-processing device (for example, in the case where the additional authentication information is a username, password, or a username/password combination).

Implementing Mechanisms

Figure 3:
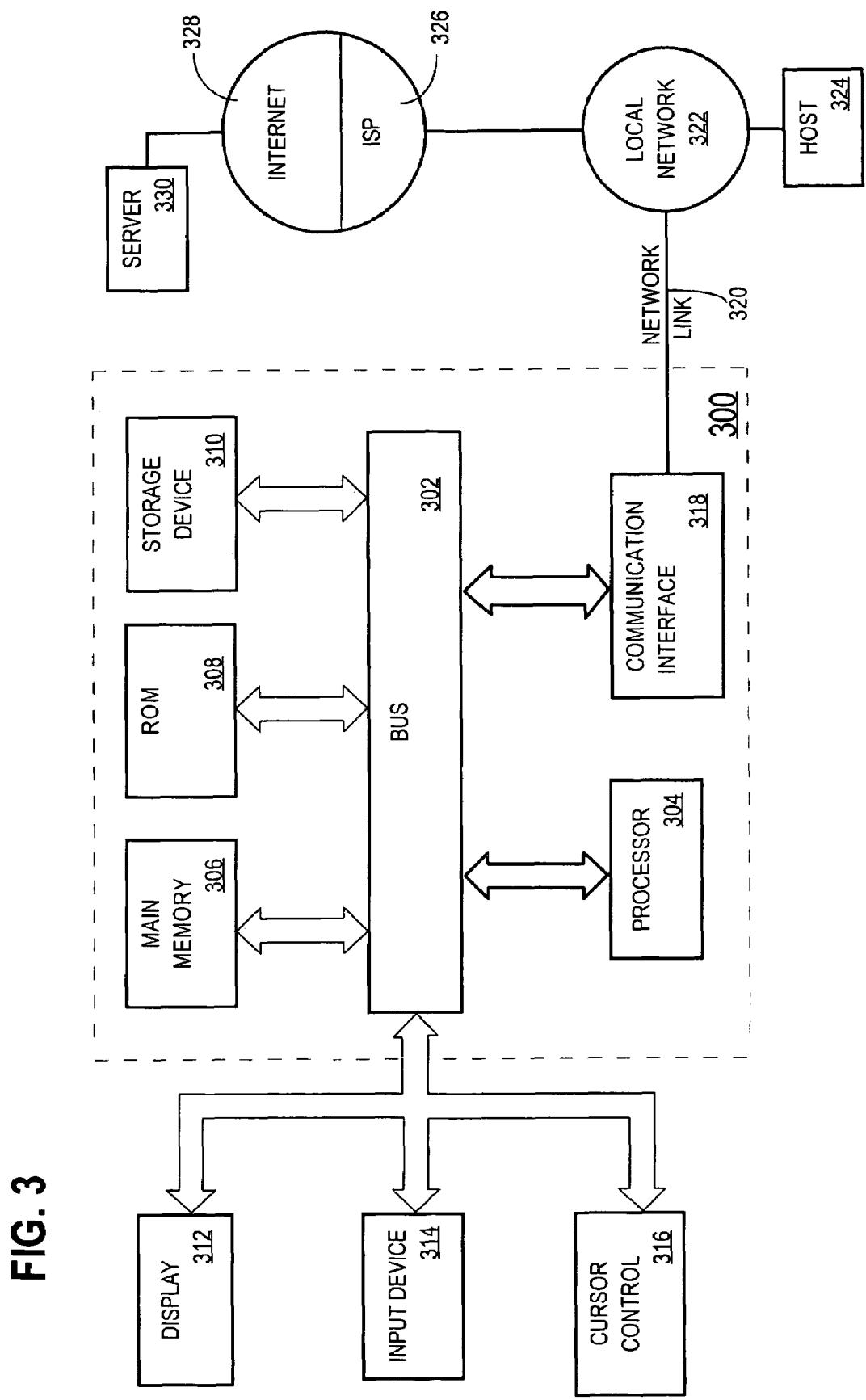
FIG. 3 is a block diagram that illustrates a computer system upon which an embodiment of the invention may be implemented.

Client 110, document-processing device 120, input device 130, and authorization server 10 may each be implemented on a computer system. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for accessing a document-processing device, comprising:
    receiving, at the document-processing device, a request to access the document-processing device;
    the document-processing device reading authentication data from an authentication token, wherein the authentication token is a portable physical object associated with a user that issued the request;
    the document-processing device determining, based on the authentication data, whether the user has sufficient user access privileges to perform the request by:
        sending, to an authorization server, a request for user access privileges for the user;
        in response to failing to receive within a specified time a reply to the request for user access privileges for the user, prompting the user to supply additional authentication information, and
        determining whether the additional authentication information indicates that the user has sufficient user access privileges to complete performance of the request; and
    upon determining that the user has sufficient user access privileges to perform of the request, the document-processing device performing the request.

2. The method of claim 1, wherein the document-processing device is a printer.

3. The method of claim 1, wherein the document-processing device is a multi-function peripheral (MFP).

4. The method of claim 1, wherein the request to access the document-processing device is a request to produce either an electronic copy or a printed copy of a document.

5. The method of claim 1, wherein the request to access the document-processing device is a request to configure the document-processing device.

6. The method of claim 1, wherein the identification token is one of: a proximity card, a common access card (CAC), a smart card, a credit card, a driver's license, and a cell phone.

7. The method of claim 1, wherein the document-processing device determining, based on the authentication data, whether the user has sufficient user access privileges to perform the request comprises:
   storing, at the document-processing device, access data that describes, for one or more functions provided by the document-processing device, a set of required access privileges that are required to access each function;
   identifying, in the authentication data, the user access privileges for said user; and
   determining, based on the access data, whether the user access privileges for said user are sufficient for said request to be processed by the document-processing device.

8. The method of claim 1, wherein determining, based on the authentication data, whether the user has sufficient user access privileges to perform the request comprises:
   storing access data that describes, for one or more functions provided by the document-processing device, a set of required access privileges that are required to access each function;
   identifying, in the authentication data, a user identifier for said user
   sending a second request, to an authorization server, for the user access privileges for said user, wherein the second request identifies the user identifier; and
   determining, based on the access data, whether the user access privileges for said user are sufficient for said request to be processed by the document-processing device.

9. The method of claim 1, wherein the request to access the document-processing device is received prior to the document-processing device determining, based on the authentication data, whether the user has sufficient user access privileges to perform the request.

10. The method of claim 9, wherein the additional authentication information corresponds to at least one of a password and a barcode.

11. The method of claim 1, wherein determining, based the authentication data, whether the user has sufficient user access privileges to perform of the request comprises:
   obtaining the user access privileges for said user;
   in response to prompting the user to supply additional authentication information, receiving the additional authentication information; and
   determining, based on both the user access privileges and the additional information, whether the user access privileges to complete performance of the request.

12. The method of claim 1, wherein the authentication data is read from an input device physically connected to the document-processing device.

13. A machine-readable medium carrying one or more sequences of instructions for accessing a document-processing device, wherein execution of the one or more sequences of instructions by one or more processors causes:
   receiving, at the document-processing device, a request to access the document-processing device;
   the document-processing device reading authentication data from an authentication token, wherein the authentication token is a portable physical object associated with a user that issued the request;
   the document-processing device determining, based on the authentication data, whether the user has sufficient user access privileges to perform the request by:
      sending, to an authorization server, a request for user access privileges for the user;
      in response to failing to receive within a specified time a reply to the request for user access privileges for the user, prompting the user to supply additional authentication information, and
      determining whether the additional authentication information indicates that the user has sufficient user access privileges to complete performance of the request; and
   upon determining that the user has sufficient user access privileges to perform of the request, the document-processing device performing the request.

14. The machine-readable medium of claim 13, wherein the document-processing device is a printer.

15. The machine-readable medium of claim 13, wherein the document-processing device is a multi-function peripheral (MFP).

16. The machine-readable medium of claim 13, wherein the request to access the document-processing device is a request to produce either an electronic copy or a printed copy of a document.

17. The machine-readable medium of claim 13, wherein the request to access the document-processing device is a request to configure the document-processing device.

18. The machine-readable medium of claim 13, wherein the identification token is one of: a proximity card, a common access card (CAC), a smart card, a credit card, a driver's license, and a cell phone.

19. The machine-readable medium of claim 13, wherein the document-processing device determining, based on the authentication data, whether the user has sufficient user access privileges to perform the request comprises:
   storing, at the document-processing device, access data that describes, for one or more functions provided by the document-processing device, a set of required access privileges that are required to access each function;
   identifying, in the authentication data, the user access privileges for said user; and
   determining, based on the access data, whether the user access privileges for said user are sufficient for said request to be processed by the document-processing device.

20. The machine-readable medium of claim 13, wherein determining, based on the authentication data, whether the user has sufficient user access privileges to perform the request comprises:
   storing access data that describes, for one or more functions provided by the document-processing device, a set of required access privileges that are required to access each function;
   identifying, in the authentication data, a user identifier for said user
   sending a second request, to an authorization server, for the user access privileges for said user, wherein the second request identifies the user identifier; and
   determining, based on the access data, whether the user access privileges for said user are sufficient for said request to be processed by the document-processing device.

21. The machine-readable medium of claim 13, wherein the request to access the document-processing device is received prior to the document-processing device determining, based on the authentication data, whether the user has sufficient user access privileges to perform the request.

22. The machine-readable medium of claim 21, wherein the additional authentication information corresponds to at least one of a password and a barcode.

23. The machine-readable medium of claim 13, wherein determining, based the authentication data, whether the user has sufficient user access privileges to perform of the request comprises:
   obtaining the user access privileges for said user;
   in response to prompting the user to supply additional authentication information, receiving the additional authentication information; and
   determining, based on both the user access privileges and the additional information, whether the user access privileges to complete performance of the request.

24. The machine-readable medium of claim 13, wherein the authentication data is read from an input device physically connected to the document-processing device.

25. An apparatus for accessing a document-processing device, comprising:
   one or more processors; and
   a machine-readable medium carrying one or more sequences of instructions, which when executed by the one or more processors, causes:
      receiving, at the document-processing device, a request to access the document-processing device;
      the document-processing device reading authentication data from an authentication token, wherein the authentication token is a portable physical object associated with a user that issued the request;
      the document-processing device determining, based on the authentication data, whether the user has sufficient user access privileges to perform the request by:
         sending, to an authorization server, a request for user access privileges for the user;
         in response to failing to receive within a specified time a reply to the request for user access privileges for the user, prompting the user to supply additional authentication information, and
         determining whether the additional authentication information indicates that the user has sufficient user access privileges to complete performance of the request; and
      upon determining that the user has sufficient user access privileges to perform of the request, the document-processing device performing the request.

26. The apparatus of claim 25, wherein the document-processing device is a printer.

27. The apparatus of claim 25, wherein the document-processing device is a multi-function peripheral (MFP).

28. The apparatus of claim 25, wherein the request to access the document-processing device is a request to produce either an electronic copy or a printed copy of a document.

29. The apparatus of claim 25, wherein the request to access the document-processing device is a request to configure the document-processing device.

30. The apparatus of claim 25, wherein the identification token is one of: a proximity card, a common access card (CAC), a smart card, a credit card, a driver's license, and a cell phone.

31. The apparatus of claim 25, wherein the document-processing device determining, based on the authentication data, whether the user has sufficient user access privileges to perform the request comprises:
   storing, at the document-processing device, access data that describes, for one or more functions provided by the document-processing device, a set of required access privileges that are required to access each function;
   identifying, in the authentication data, the user access privileges for said user; and
   determining, based on the access data, whether the user access privileges for said user are sufficient for said request to be processed by the document-processing device.

32. The apparatus of claim 25, wherein determining, based on the authentication data, whether the user has sufficient user access privileges to perform the request comprises:
   storing access data that describes, for one or more functions provided by the document-processing device, a set of required access privileges that are required to access each function;
   identifying, in the authentication data, a user identifier for said user
   sending a second request, to an authorization server, for the user access privileges for said user, wherein the second request identifies the user identifier; and
   determining, based on the access data, whether the user access privileges for said user are sufficient for said request to be processed by the document-processing device.

33. The apparatus of claim 25, wherein the request to access the document-processing device is received prior to the document-processing device determining, based on the authentication data, whether the user has sufficient user access privileges to perform the request.

34. The apparatus of claim 33, wherein the additional authentication information corresponds to at least one of a password and a barcode.

35. The apparatus of claim 25, wherein determining, based the authentication data, whether the user has sufficient user access privileges to perform of the request comprises:
   obtaining the user access privileges for said user;
   in response to prompting the user to supply additional authentication information, receiving the additional authentication information; and
   determining, based on both the user access privileges and the additional information, whether the user access privileges to complete performance of the request.

36. The apparatus of claim 25, wherein the authentication data is read from an input device physically connected to the document-processing device.

* * * * *